UNITED STATES PATENT OFFICE.

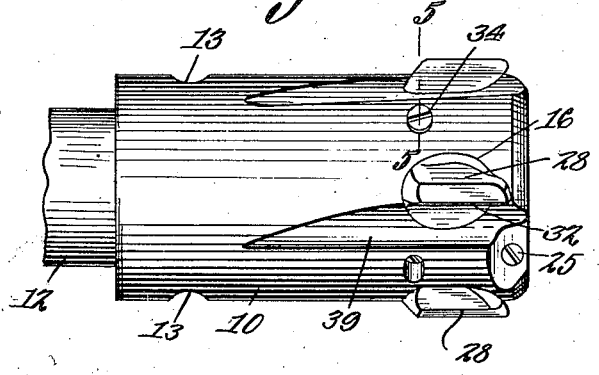

JOHN WITANOWSKI, OF CHICAGO, ILLINOIS.

REAMER.

1,202,139.  Specification of Letters Patent.  Patented Oct. 24, 1916.

Application filed May 25, 1916. Serial No. 99,788.

*To all whom it may concern:*

Be it known that I, JOHN WITANOWSKI, a citizen of the United States, residing at Chicago, in the county of Cook and State of Illinois, have invented new and useful Improvements in Reamers, of which the following is a specification.

This invention relates to reamers having adjustable cutters to vary the size of the cut, adjustment being effected by a traveling nut having a cone-shaped end engaging the inner ends of the cutters, the latter being advanced when the nut is advanced.

The invention has for its object to provide a novel and improved adjusting means of the kind stated, whereby any desired adjustment may be readily and accurately effected.

With the object stated in view, the invention consists in a novel combination and arrangement of parts to be hereinafter described and claimed, reference being had to the accompanying drawing forming a part of this specification.

In the drawing, Figure 1 is a side elevation of the tool; Fig. 2 is an end view thereof; Fig. 3 is a central longitudinal section; Fig. 4 is a section on the line 4—4 of Fig. 2; Fig. 5 is a section on the line 5—5 of Fig. 1; Fig. 6 is a side elevation of one of the cutters; Fig. 7 is a rear end view of the cutter, and Fig. 8 is a front end view of the cutter.

Referring specifically to the drawing, 10 denotes the stock of the tool, the same being cylindrical and having at its inner end a socket 11 for connection to the support or tool spindle 12, the stock being locked on the spindle by a cross pin 14 projecting at its ends from the side of the spindle and seating in side apertures 13 in the socketed end of the stock. The stock 10 also has an axial bore 15 extending forward from the socket 11, and from which bore recesses 16 extend forward and sidewise to open through the side of the stock adjacent to its forward end. The cutters, to be presently described, seat in these recesses, any desired number thereof being provided. The drawing shows a tool having four cutters. At the junction of the recesses 16 with the bore 15, the latter is continued with a reduced diameter, as shown at 17, to a circular recess 18 in the outer end of the stock.

In the bore 15 is slidably mounted a cylindrical nut 19 having its end which faces the inner ends of the recesses 16, made conical as shown at 20. The nut is tapped to receive the threaded end of a non-traveling screw 21 mounted in the bore 17, and having a head 22 which seats in the recess 18 and has an angular socket 23 for application of a key wrench or other suitable tool for turning the screw. The head 22 also has an annular groove 24 in its side into which extends the inner end of a screw 25 threaded sidewise through the stock 10, so that, while the screw 21 is free to turn, it is held against travel in the direction of its length.

The turning of the screw 21 will operate to move the nut 19 longitudinally, or axially with respect to the stock 10, the nut being prevented from turning in the bore 15 by a screw 26 threaded sidewise through the stock and having its inner reduced end seating in a longitudinal groove 27 in the side of the nut.

In each recess 16 is slidably mounted a cutter having its body or shank 28 cylindrical to conform to the cross-section of the recess. The cutter has two side bevels 29 at its inner end, leaving a butt rear end 30 which is engageable by the conical end 20 of the nut 19. Adjacent to the end 30 and between the bevels 29, the cutter has an oblique face 31, which latter lies in contact with or in proximity to the end of the screw 21 which projects from the nut 19. The outer end of the cutter body has a hollow-ground cutting portion 32, and in the side of said body is a longitudinal groove 33. A screw 34 threaded sidewise through the stock 10 and having its inner end seating in the groove 33 holds the cutter from turning in the recess 16 but leaves it free to slide therein.

It will be seen from the foregoing, that when the screw 21 is turned to advance the nut 19, the cutters 28 are pushed outward to project the desired distance from the side of the stock 10, and motion of the nut in the opposite direction allows the cutters to be pushed inward.

The outer face of the screw head 22 is flush with the corresponding end of the stock and has a circular series of graduations 35 coöperating with index marks 36 on the end of the stock for accurately gaging the herein before described adjustment of the cutters 28.

To lock the cutters 28 in adjusted position, a screw 37 is threaded into the outer end of the stock 10 opposite each cutter. The inner end of this screw is conical as shown at 38 and bears against the side of the cutter.

The surface of the stock 10 where the cutters 28 protrude is sunken as shown at 39 to conform to the hollow of the cutting portions 32 and to promote the curling of the shavings.

The stock 10 is loose on the pins 14, which relieves the tool of inaccuracy in centering—from stiffness—, and allows it to center itself when inserted into the work, or as the work is advanced about the tool.

I claim:

1. A reamer comprising a stock having an axial bore, and recesses extending forwardly and sidewise therefrom through the side of the stock, a nut slidably and non-rotatably mounted in said bore and having a conical end, a non-traveling screw extending axially into the stock from the outer end thereof and threaded into the nut, cutters slidably and non-rotatably mounted in the aforesaid recesses and abutting at their inner ends against the conical end of the nut.

2. A reamer comprising a stock having a socket at its inner end for connection to a support, and an axial bore extending forward from the socket, with recesses extending forwardly and sidewise from the bore through the side of the stock, a nut slidably and non-rotatably mounted in said bore and having a conical end, a non-traveling screw extending axially into the stock from the outer end thereof and threaded into the nut, cutters slidably and non-rotatably mounted in the aforesaid recesses and abutting at their inner ends against the conical end of the nut.

3. A reamer comprising a stock having an axial bore, and recesses extending forwardly and sidewise therefrom through the side of the stock, a nut slidably and non-rotatably mounted in said bore and having a conical end, a non-traveling screw extending axially into the stock from the outer end thereof and threaded into the nut, cutters slidably and non-rotatably mounted in the aforesaid recesses and abutting at their inner ends against the conical end of the nut, and set screws threaded into the stock from the outer end thereof to engage the cutters and lock the same in the recesses.

4. A reamer comprising a stock having an axial bore, and recesses extending forwardly and sidewise therefrom through the side of the stock, a nut slidably and non-rotatably mounted in said bore and having a conical end, a non-traveling screw extending axially into the stock from the outer end thereof and threaded into the nut, cutters slidably mounted in the aforesaid recesses and abutting at their inner ends against the conical end of the nut, the shanks of said cutters having side grooves, and set screws threaded through the stock to enter said side grooves.

In testimony whereof I affix my signature.

JOHN WITANOWSKI.